March 31, 1970     O. W. BOBLITZ     3,504,336
SAFETY SEAT BELT WARNING SYSTEMS FOR PASSENGER SECURITY Filed Sept. 2, 1965     4 Sheets-Sheet 3

INVENTOR
OLIVER W. BOBLITZ

ATTORNEY

March 31, 1970     O. W. BOBLITZ     3,504,336
SAFETY SEAT BELT WARNING SYSTEMS FOR PASSENGER SECURITY Filed Sept. 2, 1965     4 Sheets-Sheet 4

INVENTOR
OLIVER W. BOBLITZ

BY *Kemon, Palmer, Stewart and Estabrook*
ATTORNEY

United States Patent Office 3,504,336
Patented Mar. 31, 1970

3,504,336
SAFETY SEAT BELT WARNING SYSTEMS FOR
PASSENGER SECURITY
Oliver W. Boblitz, 1717 G St. NW.,
Washington, D.C. 20006
Filed Sept. 2, 1965, Ser. No. 484,655
Int. Cl. B60q 1/26, 5/00
U.S. Cl. 340—52
6 Claims

ABSTRACT OF THE DISCLOSURE

Safety seat belt systems for vehicles are improved by incorporating an audio and/or visual warning feature that is actuated by lack of adequate snugness in belts of seats occupied by passengers. The warning feature is automatically deactivated for unoccupied seats by a unique design of pressure-sensitive electrical seat switches in the seats.

This invention relates to safety seat belt systems for motor vehicles. More particularly, it concerns improvements in safety seat belt systems, comprising an audio or visual indicating feature that signals proper fastening of the seat belt that (1) automatically accommodate the indicating feature of the safety system to changes in the number of occupants of the motor vehicle, and (2) require all occupants to have their safety belts fastened properly during operation of the motor vehicle.

The utility of safety belts when properly installed in motor vehicles, including not only private passenger cars but also motor trucks, buses and the like, to prevent serious injury or death to occupants of the vehicles has been sufficiently established to justify a large number of political jurisdictions to now require these seat belts to be standard equipment on motor vehicles. Nevertheless, there is a large segment of the public using motor vehicles, particularly passengers in private automobiles, who would rather risk the possibility of injury or death than subject themselves to the slight inconvenience of fastening a seat belt about them and keeping it fastened during their passage in the motor vehicle.

Public officials and automotive manufacturers have come to realize that methods must be devised to enforce persons to use the seat belt now required as equipment on motor vehicles. It is clear the mere presence of the seat belts in the motor vehicle is not sufficient. If use of the seat belts is not enforced by public law or some other effective means, the requirement for motor vehicles to have seat belts as standard equipment will have little or no beneficial effect except possibly that of having increased employment as a result of manufacture of the seat belts demanded by the legislation.

Parties concerned with motor vehicle safety and the problem of enforcing use of safety belts in automobiles and other forms of motor vehicles have devised numerous arrangements to try to persuade or enforce occupants of vehicles to fasten seat belts and maintain them in a safe operating condition throughout passage in the vehicle. Improvements in the field of safety belts are also disclosed and claimed in my copending patent applications Ser. No. 369,098, filed May 21, 1964 now abandoned, and Ser. No. 407,843, filed Oct. 30, 1964 now U.S. 3,381,268.

Notwithstanding the clear recognition of the safety seat belt use enforcement problem and the attempts of those concerned with automotive safety to provide an adequate remedy, deficiencies exist in the known safety belt devices and systems so that the problem remains at this date still in full bloom. Obviously, expense is an important consideration and any arrangement to be effective and to be acceptable to the automotive trade and law enforcement persons must be simple and very low in cost. Moreover, it must be compatible with existing seat belt systems, i.e., it should not be limited to use only with newly installed seat belt systems since this would avoid literally millions of existing motor vehicles. Variations in motor vehicle seating arrangements and seat constructions, particularly differences between front and back seats in automobiles, also demand that equipment of this type shall be adaptable to virtually any form of seating arrangement. Additionally, seat belt systems arranged to enforce use of the seat belts either to permit operation of the car, compliance with law enforcement regulations, manipulate audio or visual indicating devices or the like should automatically compensate for the number of occupants in a motor vehicle between the minimum and maximum possible for that vehicle. A belt use enforcement arrangement which requires the vehicle operator to manipulate switches or other elements in order to accommodate for the number of passengers in the vehicle will not be acceptable to the automotive industry or the general public. This automatic compensation should extend to partial operation of the vehicle even when not occupied by an operator, e.g., when the vehicle is in shop for repair and the motor or other parts must be run in order for repairs or tests to be made.

The use of shoulder or harness type safety belts is now preferred by many users of automobiles and any automatic arrangement for enforcement of use of safety belts must be compatible with these shoulder or harness devices. The term "safety seat belt system" as used herein and throughout the accompanying claims is meant to include not only safety belt systems in which the belts fasten across the lap of the vehicle occupant, but also across the shoulders or other body portions. The term further comprehends any safety belt systems regardless of where they attach upon the motor vehicle, be it the side of the vehicle frame, the top of the frame, horizontal floor members, vertical rear or front seat members or any other sections of the vehicle having sufficient strength to secure and hold the belt in operative position.

A principal object of this invention is the provision of new improvements in safety seat belt systems for motor vehicles. Further objects include:

(1) The provision of improvements in such belt systems which have an audio or visual indicating feature to indicate proper fastening of a seat belt, which improvements can be used with all present and future approved standard seat belts, buckles and related hardware.

(2) The provision of automobile safety seat belt systems comprising belt operated switches and seat operated switches which can be used in part or in combinations as required, depending upon whether applied to seat belt systems already existing in automobiles or systems which are to be newly installed in automobiles.

(3) The provision of simple, highly effective electrical switch elements which will enable both new and existing safety seat belt systems to be installed with a view to enforcement of use of the seat belts by vehicle occupants while automatically compensating for the absence in the motor vehicle of occupants from seats where such occupancy would be normally possible.

(4) The provision of such improvements in safety seat belt systems which are extremely simple in construction and accordingly, sufficiently economical to permit the improvements to be utilized on a nationwide basis.

(5) The provision of such improvements in safety seat belt systems which may be used both with front and rear seats of automobiles, with shoulder or harness systems as well as lap belt systems and which may be attached with equal effectiveness not only to the floor of the vehicle but to the side, top and vertical frame portions or the like.

(6) The provision of such safety belt improvements which are adaptable to all vehicles now in use or being produced, i.e., those using seat belts already installed or being installed.

(7) The provision of audio or visual indicating arrangements for safety seat belt systems which not only indicate whether a belt associated with an occupied seat of a motor vehicle is fastened, but also whether the belt is too loose to be effective, i.e., to indicate an excess of slack beyond a pre-set level as required by such standards as may be established by police regulations, automotive indusrty standards or the like.

(8) The provision of such safety belt systems which comprise pressure-sensitive switches for use under seat cushions that will not operate until a predetermined weight is applied, i.e., would not be affected by placing light weight packages upon the automobile seat, and without adversely affecting seat comfort or seat flexing.

(9) The provision of such pressure-sensitive switch devices which may be installed within cushioned automobile seats by a simple insertion procedure not requiring slitting of fabric or otherwise damaging the seat construction.

(10) The provision of audio or visual indicating safety seat belt systems of accelerator pedal switch devices which will activate the belt signaling or indicating system and stay on until the ignition system of the motor vehicle is turned off.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished according to the present invention by the new safety seat belt systems which comprise a single pole, double throw switch element uniquely arranged for operation by manipulation of the belt in combination with a specific form of pressure-sensitive electrical switch for each seat of the motor vehicle normally to be occupied by the operator or passenger of the motor vehicle and in further combination with some audio or visual indicating element effective to indicate proper fastening of the safety belt, e.g., buzzer, dashboard light sign, special rear window light visible to traffic enforcement officers or the like. This combination of elements in safety belt systems, according to the invention, creates operator and passenger security by enforcing use of safety belts either by effective persuasion upon the occupants of the motor vehicle or by external indication of condition of use insuring employment of the safety belts as required by law.

In the preferred embodiment of the invention, the new safety belt system devices are of the "roll-up type." The invention comprehends a modified form of a non-roll-up type. With these two forms of the device, it is possible to provide installations in all vehicles now in use or now in production as well as motor vehicles envisioned for the future.

A more complete understanding of the new seat belt systems of the invention may be had by reference to the accompanying drawings in which.

Basically, the new safety belt systems of the invention comprise belt switch means 2, seat switch means 4, belt section 6, fastening means 8, and audio or visual indicating elements 10 or 10a.

Advantageously, the belt switch device 2 takes the form of a belt reel arrangement illustrated in FIGURES 6–10 to which attention is now directed.

Figure 6:
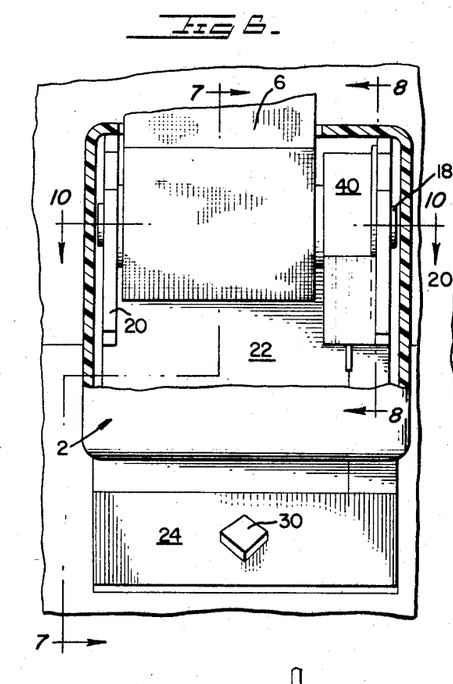
FIGURE 6 is an enlarged fragmentary view, partially in section, of a seat belt reel arrangement in accordance with the invention.
Figure 7:
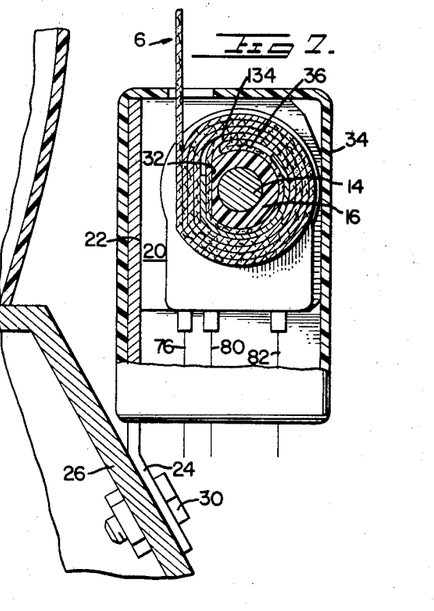
FIGURE 7 is a fragmentary sectional view taken along line 7—7 of FIGURE 6.

In the reel form of belt switch 2, the belt section 6 rolls upon the reel 12 formed with a central metal shaft 14 and a surrounding spindle 16, the latter being preferably formed of rigid moldable, high molecular weight plastic of high compressive and tensile strength such as nylon, polyacetal, phenol-aldehyde or similar resin.

The ends 18 of the metal shaft 14 are journalled in the side lugs 20 which are bent or otherwise formed upon the base plate 22 which has an angled lower end 24 fastened to the vehicle frame member 26 by fastening means 30.

The plastic spindle 16 is generally cylindrical, but has a flattened surface 32 and the belt section 6 is clamped to rotate with the spindle 16 by the metal clip 34 which fixes the looped end 36 of belt 6 about the spindle 16.

Rotation of the spindle 16 to reel in the belt when not in use is created by the coiled spring 38 enclosed within the housing 40 molded from suitable plastic material or otherwise suitably formed with a circular enclosure 42, a mounting section 44 and a lock screw section 46.

Figure 8:
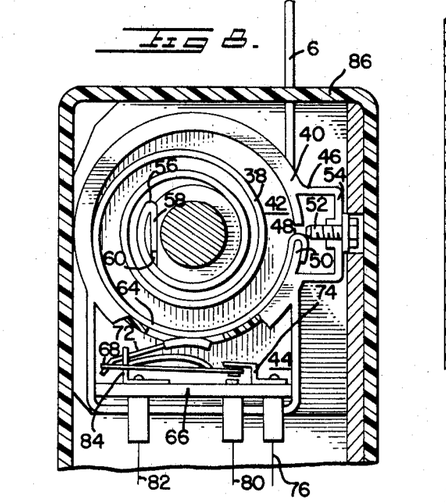
FIGURE 8 is an enlarged sectional view of a portion of the reel device shown in FIGURE 6 taken along the line 8—8 of FIGURE 6.

The coiled spring is held at its outer end 48, which is bent in the form of a U to fit over the lug 50 molded in the housing 40. A fastening screw 52 is threaded through the side 54 or the housing 46 and serves to hold the end 48 of the spring from jumping off the lug 50.

The inner end 56 of the spring 38 has a reverse bend 58 which fits into the slot 60 cut or molded into the end 62 of the plastic spindle 16. With the two ends 48 and 56 of the spring 38 fastened as described, rotation of the spindle 16 by pulling of the belt 6 in the direction of the arrow shown in FIGURE 8 to unreel the belt causes the spring 38 to coil into the compressed form shown in FIGURE 9. In turn, this causes the outer convolution 64 of the spring to move away from contact with the inner surface of the circular enclosure 42 and toward the spindle end 62.

Figure 9:
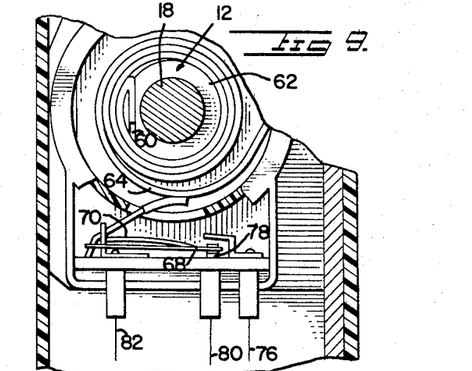
FIGURE 9 is an enlarged fragmentary sectional view of the reel section shown in FIGURE 8 with the spring element of the reel in the fully coiled condition.
Figure 10:
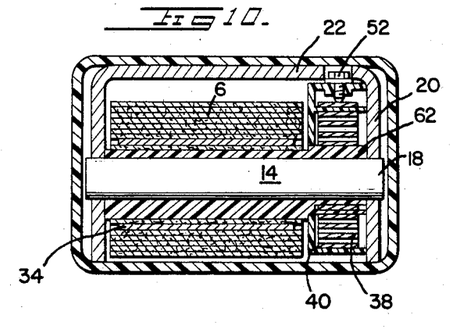
FIGURE 10 is an enlarged top sectional view of the belt reel device taken along the line 10—10 of FIGURE 6.

The side mounting extension 44 on the housing 40 has affixed thereto by rivets, cement or other suitable fastening means a single pole, double throw switch 66 having a pivoted switch element 68, snap spring 70 and pivoted lever arm 72 arranged so that when the lever arm 72 is depressed as shown in FIGURE 8, element 68 is snapped into contact with pole 74 electrically connected to lead wire 76 and when pressure on lever 72 is released, as shown in FIGURE 9, switch element 68 contacts pole 78 electrically connected to lead wire 80. Electrical circuit through the switch 66 is made through lead wire 82 and L-shaped support member 84 to the switch element 68 and then to either pole piece 74 or 78.

The entire arrangement of belt reel and electrical switch means as described in connection with FIGURES 6–10 may be enclosed in a suitable covering 86 molded from vinyl plastisol, stamped for metal or otherwise suitably formed.

Figure 11:
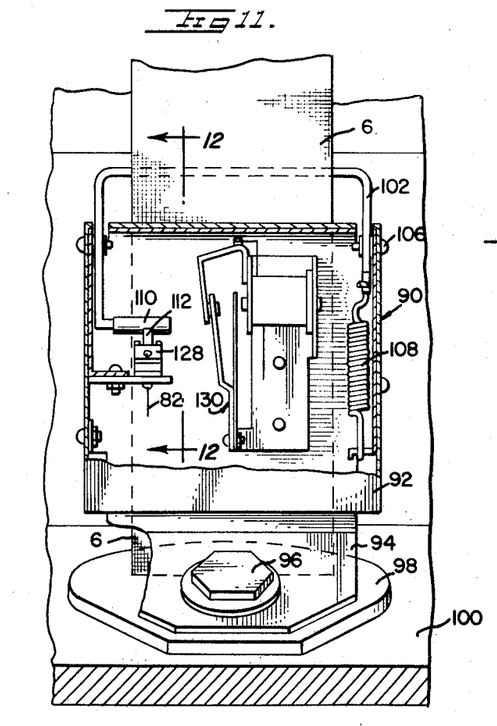
FIGURE 11 is a fragmentary side view, partially in section, of a modified form of a belt switch element for use in safety belt systems in accordance with the invention.
Figure 12:
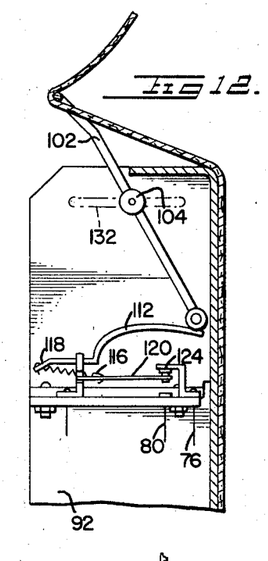
FIGURE 12 is a fragmentary side sectional view taken along the line 12—12 of FIGURE 11 showing the electrical switch device in the unfastened belt position.
Figure 13:
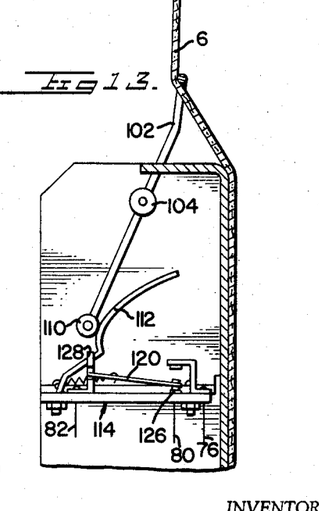
FIGURE 13 is an enlarged side fragmentary sectional view similar to FIGURE 12, but withthe electrical switch device in the belt fastened position.

An alternative form of belt controlled switch 90 is shown in FIGURES 11–13. This form of switch is particularly effective for applying the improvements of this invention to pre-existing safety belt installations.

The alternative switch 90 comprises a housing 92 from which a mounting lug 94 extends at the base, permitting the switch 90 to be fastened with the same mounting bolt 96 which secures the anchor plate 98 for the belt 6 to the motor vehicle frame member 100. With a seat belt which has already been installed in the motor vehicle, the unit 90 is installed by simply unbolting the bolt 96, slipping the lever arm 102 over the anchor plate 98 and the belt 6, passing the bolt 96 through a hole (not visible) in the mounting lug 94 and tightening the bolt 96 so both lug 94 and anchor plate 98 are secured to the frame member 100.

The lever arm 102 is pivoted between washers 104 on the pins 106 and is biased by the spring 108 into a closed position as shown in FIGURE 12. When the belt 6 is pulled by a vehicle occupant with sufficient tension to overcome the biasing force of spring 108, lever arm 102 pivots into an opened position as shown in FIGURE 13. The insulated roller end 110 of the lever arm 102 rides along the lever arm 112 of the electric switch 114. The toggle spring 116 is stretched between the end 118 of the lever arm 112 and an opening in the movable switch pole piece 120, normally biasing the lever arm 112 into an opened position as shown in FIGURE 13. When the pivoted arm 102 moves lever arm 112 downwardly, the action of toggle spring 116 is to snap movable pole piece 120 into contact with stationary switch pole 124. Conversely, movement of the pivoted arm 102 to the position shown in FIGURE 13, by fastening of seat belt 6, allows lever arm 112 to move outwardly causing the movable pole piece 120 to snap into contact with stationary pole piece 126 which is electrically connected to lead wire 80. Electrical current through the switch 114 travels through lead wire 82 and L-shaped pivot member 128 to movable pole 120 and then to either fixed pole 124 and lead 76 or fixed pole 126 and lead 80.

Figure 1:
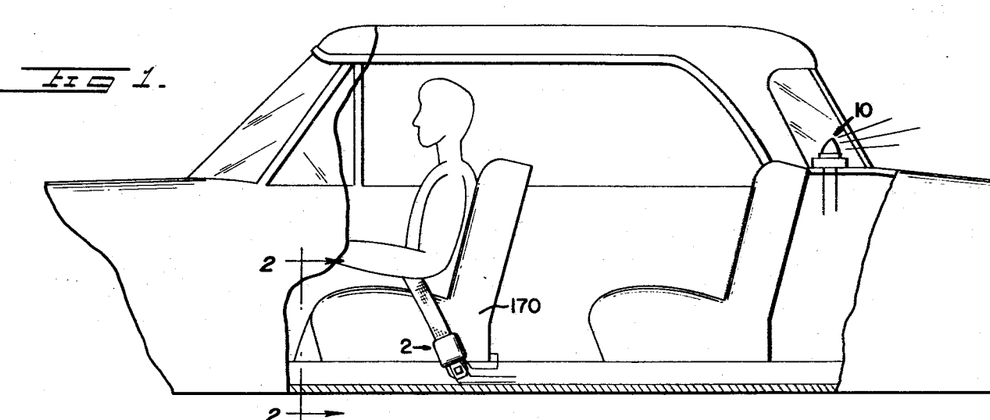
FIGURE 1 is a fragmentary side view of a motor vehicle equipped with the improved safety seat belt systems of the invention including a rear window indicating light visible by law enforcement officers or other persons for external determination of the condition of use of the safety belts of the motor vehicle.
Figure 2:
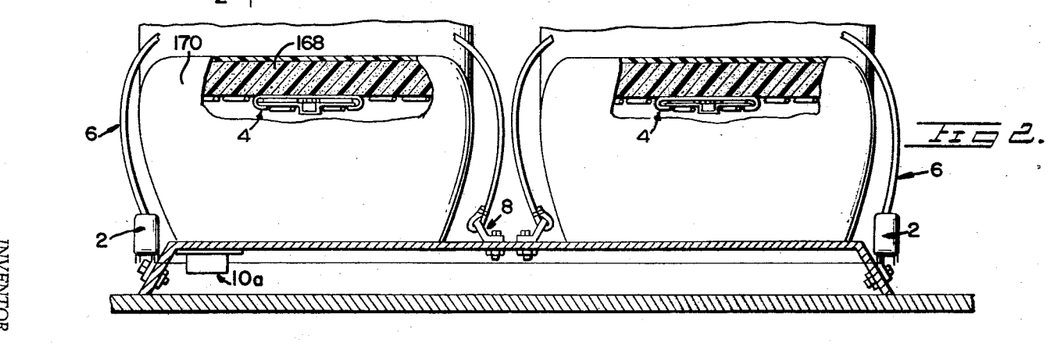
FIGURE 2 is a fragmentary enlarged sectional view of the front seat section of the motor vehicle taken along the line 2—2 of FIGURE 1.

A buzzer 130 of standard construction may advantageously be enclosed in the housing 90 to serve as an audio indicating means for the safety belt systems or the buzzer 10a may be in a separate housing as shown in FIGURE 2.

The pressure-sensitive seat switches 4 are designed for cooperation with the belt switch units described above to automatically accommodate the seat belt systems of the invention to variations in the number of occupants of the motor vehicle.

Figure 3:
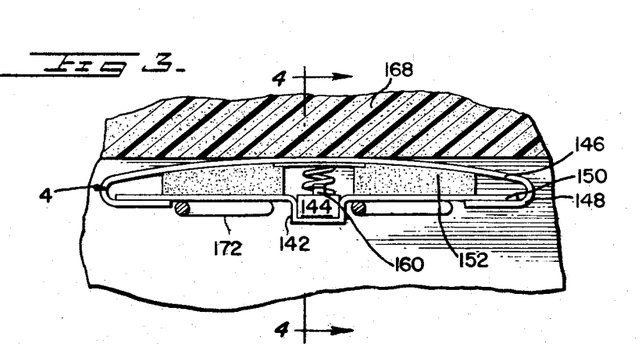
FIGURE 3 is a fragmentary enlarged sectional view of an automotive seat showing a pressure-sensitive electrical switch made in accordance with the invention.
Figure 4:
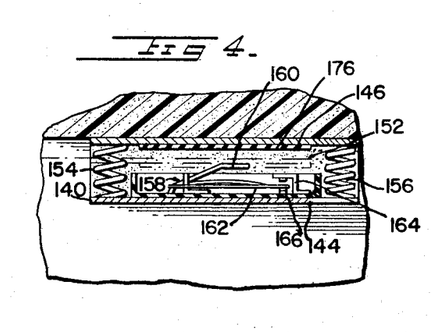
FIGURE 4 is an enlarged fragmentary sectional view taken along the line 4—4 of FIGURE 3.

Each pressure-sensitive switch comprises a base plate 140 formed of metal, plastic or other suitable material with a central depression 142 in which there is fixed by cement, fasteners or the like, an elongated cup 144 molded or otherwise suitably formed of rigid plastic, hard rubber or other electrically insulated material. A top plate 146 advantageously formed of metal, but also capable of fabrication from sheet plastic, molded plywood or the like is provided with folded ends 148 to enclose the ends 150 of the base plate 140. Fixed between the base plate 140 and the cover 146, such as by cement, are shaped sections of resilient material 152, e.g., sponge rubber, polyurethane foam or the like, which, in combination with coiled springs 154 and 156, serve to bias the cover 146 away from the base 140.

Carried in the cup 144 is a snap-action electrical switch 158 of the same general type as used in the belt switch unit (see FIGURES 8 and 9). The switch comprises an operating lever 160, movable pole piece 162, a first stationary pole 164 and a second stationary pole 166.

Electric switch 158 operates by snap action between stationary pole pieces 164 and 166 by depression of the lever 160 caused by application of pressure on the cover 146. The pressure is transmitted through the padding or upholstering material 168 of the vehicle seat 170. Downward movement of the base 140 is resisted by springs 172 of the vehicle seat so the pressure causes cover 146 to move closer to base 140.

The degree of pressure which must be applied to the cover 146 of the switch 4, in order to move it down toward base 140 sufficiently to depress the switch operating lever 160 and cause snap action from one switch position to another may be regulated by the strength of the coiled springs 154 and 156, the rigidity and size of foam members 152. Advantageously, these factors are controlled so that a weight of about 20 to 50 pounds must be placed upon the vehicle seat before the switch lever 160 becomes depressed and the switch electrically indicates occupation of the vehicle seat. Such a pressure control enables normal size packages or the like to be placed upon the vehicle seat without the automatic feature of the seat belt systems indicating presence upon the seat of an occupant. This undesired indication would require the safety belt of the seat to be fastened to stop sounding of a warning buzzer as explained hereinafter.

A pressure-sensitive electric switch of the form shown in FIGURES 3 and 4 is uniquely suited for use in safety belt systems of the invention for several reasons. First, the switch unit 4 is relatively thin and when installed in an automobile seat, does not create any unsightly protrusion or cause discomfort to the occupant of the seat. Further, the action of the movable cover 146 in conjunction with resilient pads 152 and coil springs 154 and 156 is to distribute locally applied pressure on the seat 170 over a sizeable area. Consequently, it is not necessary for the occupant of the seat to sit directly over the switch unit 4 as the switch construction will properly function even if the occupant is not fully centered in the seat or as the occupant moves about on the seat. Additionally, a switch unit of this form need not be installed in the motor vehicle at the time the seat is installed at the factory. Without cutting any fabric or otherwise damaging a completed automobile, the pressure-sensitive switch 4 may be inserted under the upholstery material 168 of an automobile seat 170 of modern construction simply by forcing the switch unit 4 at the rear of the seat 170 up over the longitudinal spring elements 172 and beneath the layer of upholstering material 168. The depression 142 in the base 140 of the switch unit will fit between two of the spring elements 172 thereby serving to keep the switch unit 4 properly centered in the seat 170.

The switch construction also protects the electric switch 158 from damage in the event that excessive weight is applied to the vehicle seat 170. Thus, the top surface of the cup 144 serves as a stop for the cover 146 thereby preventing it from being depressed toward the base 140 closer than the height of the switch enclosure cup 144.

A strip of insulating material 176 may be fixed, such as by cement, to the bottom of the switch cover 146 in order to electrically insulate the cover from the switch 158, particularly the operating arm 160. This insulation strip 176 may be eliminated where the cover 156 is formed of electrically insulating material such as molded plastic.

An adapter may be used to accommodate the new belt switch units to installations on automobile back seats where extra length is required to bolt the belt sections to the vehicle frame behind the seat. This adapter can be any suitable section of belt material to which there is stitched a mounting plate such as anchor plate 98. The switch unit would be bolted at one end to this adapter, which, in turn, would be bolted at the other end to the vehicle frame.

Anyone occupying a seat equipped with seat belts and with this device will cause a buzzer or warning light to come on until seat belts are fastened, and if seat belts are too loose to be effective, buzzer or light will warn occupant using the seat. When seat belt use is required by law, this device will help make enforcement possible by a blue special light visible night or day from left rear of vehicle. This blue light is on only when all passengers have their seat belts fastened. The blue light on vehicle would have a deterrent effect on operator and passengers, thereby causing a substantial increase in the use of seat belts. With this device in school busses or any large passenger carrying conveyance, the operator would be warned when anyone is occupying a seat without their seat belt being fastened.

As an alternative to the buzzer, a lighted sign may be used, e.g., a sign which reads when lit "Warning—Fasten Seat Belts."

Figure 5:
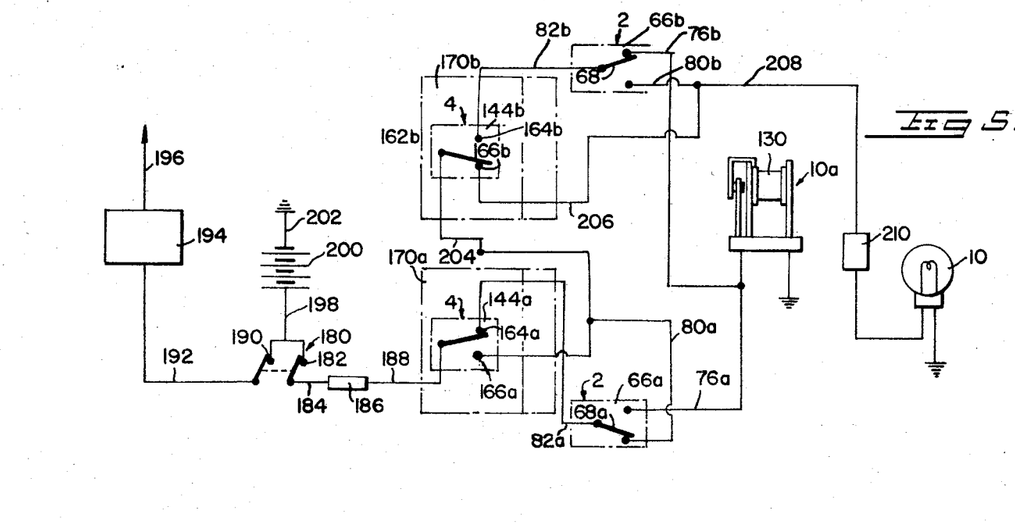
FIGURE 5 is a diagrammatic view showing an electrical circuit for one embodiment of a safety seat belt system of the invention.

Electrical connections for combining the belt switch 2 and seat switch 4 for operation of a visual indicating means 10 and/or audio indicating means 10a is illustrated in FIGURE 5 which diagramatically illustrates electrical wiring for two front seats of a motor vehicle such as in FIGURE 2.

The seats 170 are each provided with a single-pole, double-throw seat switch 4 and a single-pole, double-throw belt switch 2.

The electrical circuit is arranged to be energized through the ignition switch 180 illustrated as a double-pole, single-throw switch, but any suitable type may be used that is employed in motor vehicles, e.g., to permit simultaneous energizing of the ignition as well as accessories or independent operation of the accessories. Advantageously, the seat belt system electrical circuit is connected to the accessory pole 182 of the ignition switch 180 through lead wire 184, fuse 186 and wire 188. In turn, wire 188 connects to the movable pole 162a of the switch 144a. The other pole 190 of ignition switch 180 is connected by lead wire 192 through ignition coil 194 and lead 196 to the motor distributor (not shown). The cable 198 connects the storage battery 200 to the ignition switch 180 with the other pole of the battery going to ground through cable 202.

The seat switch 144a for the driver's seat 170a has lower stationary switch pole 166a connected by wire 204 to movable pole 162b of the seat switch 144b of the right-hand seat of the motor vehicle while the upper stationary pole 164a connects with lead wire 82a of the corresponding seat switch 66a. The lower stationary pole 166b of switch 144b connects through wire 206 to the conductor 208 leading to the electric lamp 10.

Lead 76 of the belt switch 66a connects to an audio indicator 10a, such as a conventional 6 or 12 volt buzzer 130. The other lead 80 from the belt switch 66a is electrically connected to lead wire 204.

Lead wire 76b of the belt switch 66b connects to conductor 208 while lead 80b of this switch connects to the buzzer 130.

As an alternative addition to the electrical circuit control by the ignition switch 180, one may use an electrical switch and relay arranged to energize the safety belt electrical circuit upon the first depression of the accelerator pedal following the switching on of the ignition switch. With such an arrangement, the audio and visual indicators would not be placed in operation until the first depression of the accelerator pedal and would then remain in operation until the ignition switch was turned off. This would allow time for passengers to fasten their safety belts after the ignition switch was turned on before the buzzer would sound and permit the accessories of the automobile controlled by the ignition switch to be used without need to fasten the safety belts.

The operation of the seat belt systems of this invention will now be described.

With reference to FIGURE 5 and assuming the driver's seat 170a of the motor vehicle to be occupied and the passenger seat 170b to be unoccupied with the seat belt at seat 170a to be properly fastened about the driver, the position of the respective seat and belt switch elements would be as shown in the FIGURE 5. The movable pole piece 162a for the seat switch 144a would be snapped into contact with switch pole 164a while the movable pole 68a of switch 66a would be snapped into contact with the stationary pole 78 (see FIGURE 9) since the belt would be unrolled from the reel moving the lever arm 72 into an upper position. In the unoccupied passenger seat, the movable switch element 162b would be in contact with pole 166a (see FIGURE 4) since no weight would be applied to the pressure-sensitive switch and the operator lever 160 would be in the upper position and the movable element of switch 66b, with this belt fully retracted (see FIGURE 8) would be in contact with pole 74 since lever element 72 would be depressed.

This arrangement of switches would produce an audio and visual indication that the seat belts of the occupied seats of the motor vehicle were properly fastened, ready to perform the safety function for which they are intended, i.e., the visual indicating means 10 would be on showing to outside viewers of the motor vehicle that the occupants' seat belts were fastened and the buzzer would be silent. The electric circuit to the lamp 10 would be from battery 200, through wire 198, switch 180, wire 184, fuse 186, wire 188, switch element 162, wire 204, switch element 162b, wire 206 and connector 208. No electrical connection would be made to the buzzer 130.

In the event that a passenger should sit in seat 170b without fastening the seat belt 66b, the light 10 would be extinguished and the buzzer 130 would sound. This would result from the switch element 162b being moved from pole 166b to pole 164b by weight of the passenger upon the switch 144b while the switch 66b would remain unaltered since the seat belt was not fastened. Movement of element 162b from pole 166b to pole 164b would cut off electric current to line 206 extinguishing the light 10 while the electric current now transferred to pole 164b would go by line 76b to buzzer 130.

Similar electrical connections would be made to other seats of the motor vehicle normally to be connected by passengers so that each, in turn, would function similarly to the switch arrangement shown with seat 170b to automatically activate the belt switch for each seat occupied by the passenger.

Any seat of a vehicle equipped with the new belt systems occupied without the belt fastened with greater than the safe amount of maximum slack would cause buzzer 130 to sound and light 10 to extinguish. As soon as the improperly fastened belt was suitably tightened, buzzer 130 would stop sounding and the electric bulb 10 would be illuminated.

Preferably, the electric bulb 10 is of high intensity, opaquely shielded except for a rear opening window, and of blue color as described and shown in detail in my co-pending application Ser. No. 407,843 referred to above. Advantageously, a flasher unit 210 of conventional form may be inserted in conductor line 208 in order to cause electric bulb 110 to flash rather than to glow steadily when conductor 208 is energized. This flashing arrangement helps to call attention to the visual indicating means 10 when the vehicle is in bright sunlight, a condition which inhibits ability of an outside viewer to ascertain whether a light bulb in a motor vehicle behind a glass window of the vehicle is illuminated.

The invention sought to be protected by United States Letters Patent is defined in the following claims:

I claim:

1. In a safety seat belt system for a motor vehicle, including audio or visual indicating means to indicate proper fastening of the safety seat belts in the motor vehicle, the improvement which comprises a reel device for retracting a section of the seat belt when the belt is not fastened about an occupant of the motor vehicle, said reel device comprising a coiled spring which uncoils as the seat belt is rolled up on the reel device, an electrical SPDT switch mounted adjacent said coiled spring, a lever arm on said switch to operate the contact elements of said switch, said lever arm being spring biased into contact at its free end with a convolution of said coiled spring whereby compression of said coiled spring through unreeling of said seat belt produces movement of said lever arm, and electrical conductors operatively connecting said switch to indicating means in the safety seat belt system.

2. In a safety belt system for a motor vehicle, including audio or visual indicating means to indicate proper fastening of the safety seat belts in the motor vehicle, the improvement which comprises a reel device for rolling up a seat belt when the belt is not fastened about an occupant of the motor vehicle, said reel device comprising a spindle upon which a section of the seat belt rolls for retraction from the vehicle seat when not in use, a band spring which coils up at one end of said belt spindle and biases said spindle to wind up the belt section upon release of tension on the belt, an electrical SPDT switch having a lever arm spring biased to move away from the contact elements of the switch, a movable contact element arranged for snap action between two stationary contact elements of the switch by action of said lever arm, said switch being mounted adjacent said band spring so that said lever arm is in contact at its free end with the outer convolution of the coil of the band spring whereby movement of said spring convolution produces a corresponding movement in the lever arm and electrical conductors connected to the stationary switch elements of the switch connecting the switch to indicating means in said safety seat belt system.

3. In a safety seat belt system for a motor vehicle, including audio or visual indicating means to indicate proper fastening of the seat belts in the motor vehicle, the improvement which comprises a pressure-sensitive seat switch and electrical conductors operatively connecting said pressure-sensitive seat switch to indicating means in the safety seat belt system, said pressure-sensitive seat switch comprising a rectangular base having a central depression therein, a cover substantially corresponding in effective area to said base separated from the base forming an enclosure therebetween, said cover being capable of movement toward said base, an electrically insulated cup fixed within the recess portion of said base, the cup being of a depth corresponding to the depth of said depression, electrical switch elements contained within said insulated cup, sections of resilient sponge material fixed between said base and said cover adjacent said recessed portion, and a coiled spring fixed between said base and said cover within the recessed portion at each end of said insulated cup, said coiled springs and said sections of resilient sponge material biasing said cover away from said base, a reel device for rolling up a seat belt when the belt is not fastend about an occupant of the motor vehicle, said reel device comprising a spindle upon which a section of the seat belt rolls for retraction from the vehicle seat when not in use, a band spring which coils up at one end of said belt spindle and biases said spindle to wind up the belt section upon release of tension on the belt, an electrical SPDT switch having a lever arm spring biased to move away from the contact elements of the switch, a movable contact element arranged for snap action between two stationary contact elements of the switch by action of said lever arm, said switch being mounted adjacent said band spring so that said lever arm is in contact at its free end with the outer convolution of the coil of said band spring whereby movement of said spring convolution produces a corresponding movement in the lever arm, and a conductor electrically connecting one of said switch elements of said seat switch to a contact element of said SPDT switch operated by said band spring.

4. In a safety seat belt system for a vehicle including audio and visual indicating means to indicate proper fastening of the safety seat belts of the plurality of vehicle seats contained in the vehicle, the improvement which comprises a belt switch and a pressure-sensitive seat switch for each of said vehicle seats, electrically operated audio indicating means, electrically operated visual indicating means, electrical conductors connecting said seat switches and said belt switches to energize only said audio indicating means in the event that one of said vehicle seats is occupied by a passenger of the vehicle without the seat belt associated with that seat being fastened and to energize said visual indicating means only in the event that all seat belts associated with all seats occupied by passengers are properly fastened.

5. In a safety seat belt system for a motor vehicle, including audio or visual indicating means to indicate proper fastening of the safety seat belts in the motor vehicle, the improvement which comprises an electrical pressure-sensitive seat switch unit and electrical conductors operatively connecting said switch unit to indicating means in the seat belt system, said pressure-sensitive seat switch unit being of wafer shape and of such size as to cover a limited area of the motor vehicle seat under which the pressure-sensitive seat switch unit is installed, said pressure-sensitive seat switch unit comprising a base having a central depression therein, a cover of substantially the same area as said base separated from the base, said cover being free to extend laterally relative to said base when the cover is depressed, electrical switch elements positioned between said base and said cover in said depression of said base, resilient elements of sponge material positioned between said cover and said base adjacent said switch elements and a pair of springs fixed between said base and said cover away from said base.

6. In a safety seat belt system for a motor vehicle, including audio or visual indicating means to indicate proper fastening of the seat belts in the motor vehicle, the improvement which comprises a pressure-sensitive seat switch unit and electrical conductors operatively connecting said pressure-sensitive seat switch unit to indicating means in the safety seat belt system, said pressure-sensitive seat switch unit comprising a rectangular base having a central depression therein, a cover substantially corresponding in effective area to said base separated from the base forming an enclosure therebetween, said cover being capable of movement toward said base, an electrically insulated cup fixed within said central depression of said base, the cup being of a depth corresponding to the depth of said depression, electrical switch elements contained within said insulated cup thereby being electrically insulated from said base and said cover, sections of resilient sponge material fixed between said base and said cover adjacent said depression, and a coiled spring fixed between said base and said cover within said central depression at each end of said insulated cup, said coiled springs and said sections of resilient sponge material biasing said cover from said base.

References Cited

UNITED STATES PATENTS

| | | | |
|---|---|---|---|
| 3,226,674 | 12/1965 | Eriksson | 340—52 |
| 3,340,523 | 9/1967 | Whitman | 340—278 |
| 3,381,268 | 4/1968 | Boblitz | 340—52 |

ALVIN H. WARING, Primary Examiner

U.S. Cl. X.R.

180—82; 307—10; 340—278

UNITED STATES PATENT OFFICE
CERTIFICATE OF CORRECTION

Patent No. 3,504,336                                                 March 31, 1970

Oliver W. Boblitz

It is certified that error appears in the above identified patent and that said Letters Patent are hereby corrected as shown below:

In the heading to the printed specification, line 4, "1717 G Street, N. W., Washington, D. C. 20006" should read -- 4607 Connecticut Avenue, N. W., Washington, D. C. 20008 --.

Signed and sealed this 8th day of December 1970.

(SEAL)
Attest:

Edward M. Fletcher, Jr.                                WILLIAM E. SCHUYLER, JR.
Attesting Officer                                                 Commissioner of Patents